Figure 1:
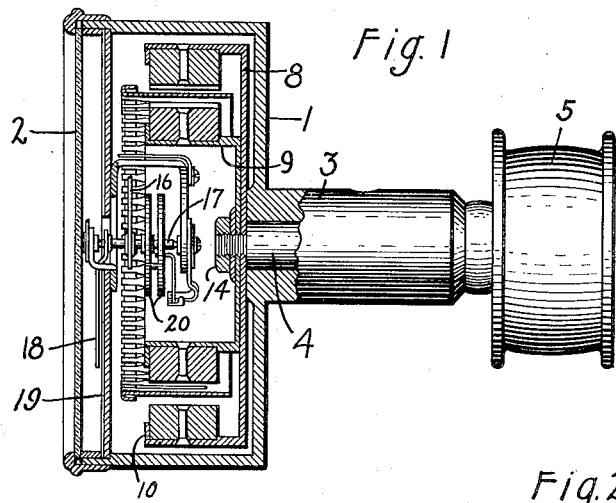

E. THOMSON.
SPEED INDICATOR.
APPLICATION FILED JUNE 29, 1908.

993,910.

Patented May 30, 1911.

Witnesses:
Lloyd C. Bush
J. Ellis Glen

Inventor:
Elihu Thomson,
By
Atty.

UNITED STATES PATENT OFFICE.

ELIHU THOMSON, OF SWAMPSCOTT, MASSACHUSETTS, ASSIGNOR TO GENERAL ELECTRIC COMPANY, A CORPORATION OF NEW YORK.

SPEED-INDICATOR.

993,910.   Specification of Letters Patent.   Patented May 30, 1911.

Application filed June 29, 1908. Serial No. 440,881.

*To all whom it may concern:*

Be it known that I, ELIHU THOMSON, a citizen of the United States, residing at Swampscott, county of Essex, State of Massachusetts, have invented certain new and useful Improvements in Speed-Indicators, of which the following is a specification.

My invention relates to electrical measuring instruments having an armature or disk in which eddy currents are generated by a magnetic field which cuts the armature, and more particularly to measuring instruments, such as speed indicators, in which a magnet is rotated and tends to move an armature or disk against a control spring as a result of the drag caused by the currents set up by the movement of the magnet.

An electrical measuring instrument depending for its action upon eddy currents generated in a closed circuit, such as a disk or armature of low electrical resistance is accurate only at the temperature at which it is calibrated, since the high temperature coefficient of copper and similar metals causes marked variations in the electrical resistance of those metals as the temperature varies. This error is particularly objectionable in speed indicators, which are subjected to widely varying temperatures while in use, and it is the object of my invention to greatly reduce the temperature error in speed indicators and other electrical measuring instruments which are dependent for their action on eddy currents generated in closed circuits or in a disk or armature of conducting material.

In carrying out my invention the movable armature or disk in which the eddy currents are generated is so constructed that a plurality of closed circuits are provided in which the eddy currents flow, each circuit being so arranged that practically all of its resistance is concentrated in a conductor formed of some metal having a low temperature coefficient. As a result of this construction changes in temperature cause very little change in the total resistance of the closed circuit for the eddy current and the instrument is substantially accurate at all temperatures.

In carrying out my invention as applied to speed indicators, a magnetic field is caused to move at a rate dependent on the speed to be measured, preferably by driving a rotating magnet in any suitable way, and a movable disk or armature is mounted in such a relation to the magnetic field or rotating magnet that the eddy currents set up in the disk or armature move it against a control spring and thereby give an indication of the speed to be measured. The movable disk or armature is made either of an alloy having a low temperature coefficient or else is arranged with a plurality of closed circuits side by side, each circuit containing a conductor having a low temperature coefficient. In the preferred arrangement, the conductor of low temperature coefficient contains practically all of the resistance of the closed circuit and is mounted outside of the magnetic field, while the low resistance part of the closed circuit is in inductive relation to the field. The plurality of closed circuits may be obtained by any suitable construction, such as looped conductors or a sheet of metal suitably slotted. The rotating magnet may be of any suitable type but is preferably arranged to produce two opposing magnetic fields adjacent to each other, while the closed circuits are so proportioned that when one conductor is in one magnetic field another conductor is in the other magnetic field and a strong flow of current takes place through the closed circuit which includes the two conductors.

My invention will best be understood in connection with the accompanying drawing, which illustrates one of the many forms in which it may be embodied, and in which—

Figure 3:
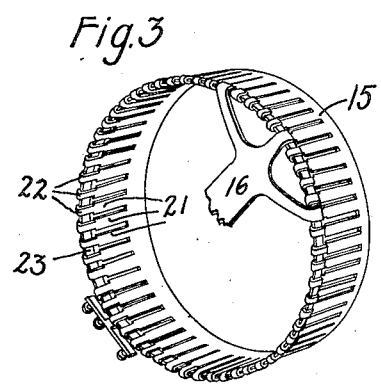
Figure 2:
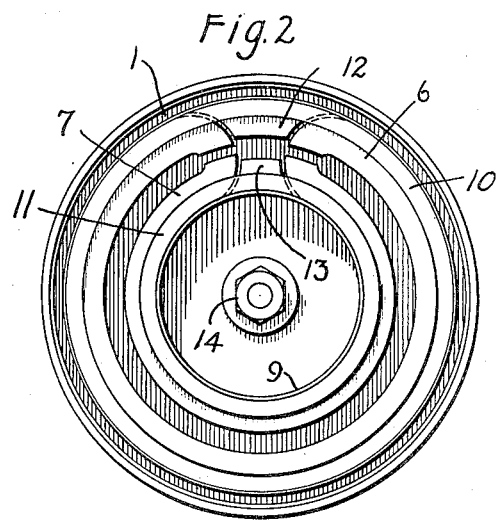
Figure 5:
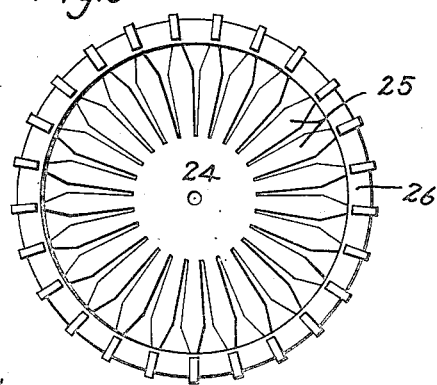
Figure 4:
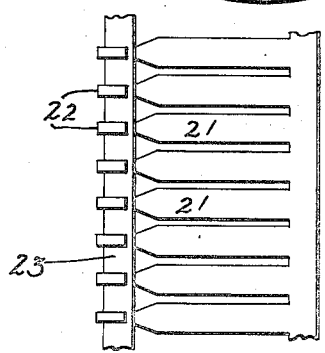

Figure 1 is a longitudinal section of a form of speed indicator embodying my invention; Fig. 2 is a plan view of the rotating magnetic system of the instrument shown in Fig. 1; Fig. 3 is a perspective view of the movable disk or armature of the speed indicator shown in Fig. 1; Fig. 4 is an enlarged plan view of a portion of the armature shown in Fig. 2; and Fig. 5 shows a disk armature embodying my invention.

Although my invention is useful in connection with any electrical measuring instrument dependent for its operation on eddy currents, I have illustrated it in the form of a speed indicator which, as shown in Fig. 1, comprises a circular casing 1 provided with a glass cover 2 for the pointer and scale plate. The casing carries a boss 3 which forms a bearing for a shaft 4 on which is mounted a pulley 5 by means of which the shaft may be rotated at a rate dependent on the speed to be measured.

A magnetic field is caused to move at a rate dependent on the speed to be measured in any suitable manner, preferably by causing a magnet mounted on the shaft 4 to rotate inside the casing. The preferred form of magnet is shown in the drawing, in which concentric circular permanent magnets 6 and 7 are mounted in such a relation to each other, as shown in Fig. 2 that two arc-shaped magnetic fields are formed which are adjacent to each other and in which the magnetic flux is in opposite directions. As shown in Fig. 2 the circumferential extent of each field need not be great, and as the magnets are rotated by the pulley 5 the two fields are carried around at a rate dependent on the speed to be measured. The two magnets which may be supported and driven in any suitable way, are preferably mounted on two circular cup-shaped magnet supports 8 and 9 to which the magnets are riveted. Flanges 10 and 11 on the magnetic supports engage the outer edge of the magnets and distance blocks 12 and 13 secured to the magnetic supports between the poles of each magnet hold the magnets rigidly in position on the supports. The two magnet supports are mounted concentric with each other on the shaft 4 and are held in position on the shaft by means of any suitable fastening device, such as a nut 14 threaded on the extension of the shaft.

The speed of movement of the magnetic field set up by the concentric magnets 6 and 7 is indicated by means of an armature 15 mounted in inductive relation to said field and arranged to rotate about the axis of the shaft 4. The mounting for the armature 15 comprises a cross-piece 16 on which is an armature shaft 17 carried in bearings on any suitable type of bracket, such as is commonly used in measuring instruments. The pointer or index 18 swings over the scale-plate 19 to show the extent of movement of the armature, and a control spring 20 which comprises two parallel spirals with their outer ends joined, is arranged to resist the movement of the armature due to the drag exerted on it by the rotating magnets. The errors produced by changes in temperature are counteracted by providing the armature 15 with a plurality of conductors 21 made of some low resistance metal, the ends 22 of the low resistance conductors being joined or connected through a connection or conductor 23 made of a metal such as manganin, having a low temperature coefficient. The conductors 21 may be arranged upon the armature in any desired way so long as they are in inductive relation to the fields of the magnets 6 and 7 and form part of a closed circuit. The armature is preferably made by slotting a strip of copper or similar low resistance material in the manner shown in Figs. 2 and 4, thereby producing a series of conductors 21 which are joined at one end by the metal of the disk and are tapered at the other end 22 where they are joined by the connection or conductor 23. Two of the conductors 21 therefore form a closed circuit through the metal of the slotted strip and the connection 23, and since the greater part of the resistance is in that portion of the connection or conductor 23 which is between the ends 22 of the conductor, changes in temperature have very little effect upon the total resistance of each closed circuit. The relation between the resistance of the conductors 21 and the resistance due to the connection 23 may be varied by changing the width of the ends 22 of the conductors. The conductors are preferably made much narrower than the magnetic fields to avoid local eddy currents in a single conductor, and are so arranged in relation to the adjacent magnetic fields set up by the magnets 6 and 7 that when one conductor is in one field, another conductor is in series with it in the other field, and a flow of current can take place through the two conductors which form a closed circuit extending through both fields.

My invention may be embodied in an armature in the form of a disk 24, as shown in Fig. 5, slotted to form a plurality of radial conductors 25 side by side, which are connected at the inner end through the metal of the disk and at the outer end by a conductor having a low temperature coefficient and made in the form of a ring 26 secured to the outer ends of the conductors 25 in any suitable manner, as by soldering. A disk constructed in this manner may be used either in those forms of speed indicators which have disk armatures or may be used in motor meters either as an armature disk or as a drag disk.

My invention may be embodied in many other forms than that shown and described, and I therefore do not wish to be restricted to the exact form shown but intend to cover by the appended claims all changes and modifications within the spirit and scope of my invention.

What I claim as new and desire to secure by Letters Patent of the United States, is,—

1. In a measuring instrument, the combination with means for producing a magnetic field, of a movable armature having a plurality of conductors mounted in inductive relation to said field to form a plurality of closed circuits, each of which has outside the said field a portion of low temperature coefficient.

2. In a measuring instrument, the combination with means for producing a magnetic field, of a rotatable armature having a plurality of conductors of low resistance metal mounted side by side in inductive relation to said field and connected outside of said field through metal having a low temperature coefficient to form a plurality of closed circuits side by side on said armature.

3. In a measuring instrument, the combination with means for producing a magnetic field, of a movable armature comprising a plurality of conductors of low resistance metal in inductive relation to said field, and a conductor having a low temperature coefficient mounted on said armature outside said field to connect said low resistance conductors into closed circuits.

4. In a measuring instrument, the combination with means for producing a magnetic field, of a movable armature comprising a plurality of conductors of low resistance metal arranged in open-ended loops in inductive relation to said field, and connections with a low temperature coefficient arranged across the ends of said loops and outside of said field to form a plurality of closed circuits.

5. In a measuring instrument, the combination with means for producing a magnetic field, of a movable armature comprising a slotted sheet of low resistance metal arranged in inductive relation to said field and conductors with a low temperature coefficient arranged to bridge said slots outside said field and thereby form a plurality of closed circuits.

6. In a measuring instrument, the combination with means for producing a magnetic field, of a movable armature having a plurality of closed circuits arranged to cut said field, each circuit comprising a conductor of low resistance metal and a high resistance conductor of a low temperature coefficient mounted outside of said field.

7. In a measuring instrument, the combination with means for producing a magnetic field, of a movable armature having a plurality of closed circuits arranged in inductive relation to said field, each circuit comprising a conductor of low resistance metal and a conductor of low temperature coefficient mounted outside of said field and constituting the greater part of the total resistance of the circuit.

8. In a speed indicator, the combination with a rotatable magnet, of a rotatable armature comprising a plurality of conductors of low resistance metal arranged side by side in inductive relation to said magnet, and means for short-circuiting the conductors in the field of said magnet through a conductor outside of said field and having a low temperature coefficient.

9. In a speed indicator, the combination with a rotatable magnet having an arc-shaped air gap between opposing pole pieces, of a circular armature mounted to rotate about the axis of rotation of said magnet, said armature comprising a slotted sheet of low resistance metal in said air gap and connections having a low temperature co-efficient arranged to bridge said slots outside of said pole pieces.

10. In a speed indicator, the combination with a rotatable magnet having an arc-shaped air gap between opposing pole pieces, of a rotatable armature comprising a cylinder of low resistance metal pivotally mounted concentric with said magnet and extending between said pole pieces, said cylinder having parallel slots cut from one edge, and a ring of metal with a low temperature coefficient mounted outside the pole pieces and connected to bridge the open ends of the slots in said cylinder.

11. In a measuring instrument, the combination with two curved concentric magnets having confronting pole pieces arranged in pairs to form adjacent magnetic fields having opposite directions of magnetic flux, of a movable armature having a closed circuit comprising a conductor of low resistance metal in each field, and connections of low temperature coefficient outside of said fields and arranged to connect said conductors in series and close the circuit between them.

12. In a measuring instrument, the combination with two curved concentric magnets having confronting pole pieces arranged in pairs to form adjacent magnetic fields having opposite directions of magnetic flux, of a movable armature having a plurality of closed circuits, each circuit comprising an open-ended loop of conductor of low resistance metal with the distance between the sides of the loop equal to the distance between said fields, and connections having a low temperature coefficient arranged to bridge the open ends of said loops outside of said fields.

In witness whereof, I have hereunto set my hand this twenty sixth day of June, 1908.

ELIHU THOMSON.

Witnesses:
JOHN A. McMANUS, Jr.,
CHARLES A. BARNARD.